United States Patent [19]
DiMeo

[11] Patent Number: 6,100,937
[45] Date of Patent: Aug. 8, 2000

[54] METHOD AND SYSTEM FOR COMBINING MULTIPLE IMAGES INTO A SINGLE HIGHER-QUALITY IMAGE

[75] Inventor: Matthew J. DiMeo, San Diego, Calif.

[73] Assignee: Conexant Systems, Inc., Newport Beach, Calif.

[21] Appl. No.: 09/087,736

[22] Filed: May 29, 1998

[51] Int. Cl.$^7$ .................................................. H04N 5/213
[52] U.S. Cl. ........................... 348/621; 348/619; 348/560
[58] Field of Search ..................... 348/620, 619, 348/621, 618, 607, 559, 560, 241, 242, 231; 358/167; H04N 5/21, 5/213

[56] References Cited

U.S. PATENT DOCUMENTS 4,987,481  1/1991  Spears et al. .......................... 348/620

*Primary Examiner*—David E. Harvey
*Attorney, Agent, or Firm*—Fish & Richardson P.C.

[57] ABSTRACT

A method and system for combining a set of n still image frames into a single reduced noise still image. The invention reduces visible noise, along with some television color artifacts, in still images captured from a video stream by combining data from multiple video frames. Each frame comprises an XY array of picture element (pixel) data. In the preferred embodiment, each pixel includes data defining an intensity level as well as color values. A weighted average of several frames of video is taken to generate a single still output frame. The weighting is determined adaptively in order to reduce inter-frame motion artifacts. The resulting output has substantially less visible noise than a simple unweighted average. The algorithm is much faster and simpler to implement than true multi-pixel motion estimation, which is not really necessary in a series of nominally-still images.

6 Claims, 2 Drawing Sheets

METHOD AND SYSTEM FOR COMBINING MULTIPLE IMAGES INTO A SINGLE HIGHER-QUALITY IMAGE

TECHNICAL FIELD

This invention relates to electronic video capture systems, and more particularly to a method and system for combining multiple image frames into a single reduced noise still image.

BACKGROUND

"Video still capture" involves a process of extracting a still image from an image set comprising a sequence of electronically-encoded image frames. A number of video capture products are on the market that allow a user to capture one or more still images from a conventional video source to an attached computer, such as a personal computer (PC). The video source can be a signal conforming to one of the well-known NTSC, PAL, or SECAM video standards, or a video camera, or sequential images from a digital camera, or recorded bvideo signals played on a video cassette recorder (VCR) or the like.

Many video sources, such as consumer-quality computer cameras and consumer VCRs, tend to have noise problems that degrade image quality. When capturing single video frames for display as still images, these problems are still visible. Some attempts have been made to reduce such noise. For example, the SNAPPY™ video snapshot product from Play, Inc. generates an unweighted average of multiple video fields without any motion compensation to output a single still image with somewhat reduced noise.

The inventor has determined that there is still a need for improved noise reduction in a video capture system. The present invention provides a method and system for achieving this end.

SUMMARY

The invention reduces visible noise, along with some television color artifacts, by combining a set of n still image frames into a single reduced noise still image. Each frame comprises an XY array of picture element (pixel) data. In the preferred embodiment, each pixel includes data defining an intensity level (Y in the YUV color space model) as well as color values (UV in the YUV color space model). However, other color space models may be used if the models define each pixel as having color space coordinates defining intensity and color values, directly or indirectly (i.e., by having separate intensity and color values, or where such information can be derived from the color space coordinates, or where the color space coordinates can be separately weighted). A weighted average of several frames of video is taken to generate a single still output frame. The weighting is determined adaptively in order to reduce inter-frame motion artifacts.

The resulting output has substantially less visible noise than a simple unweighted average. The algorithm described above is much faster and simpler to implement than true multi-pixel motion estimation, which is not really necessary in a series of nominally-still images. If averaging is done on individual NTSC-derived images in the YUV or YIQ color spaces, and if weights are based only on pixel intensity, television-related color artifacts may also be reduced by a comb filtering effect.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

The invention will be described in the context of a conventional image capture system the provides a series of decoded video image frames to a buffer memory of a computer system. The invention operates on the contents of the buffer memory to provide a still image with reduced noise.

Figure 1:
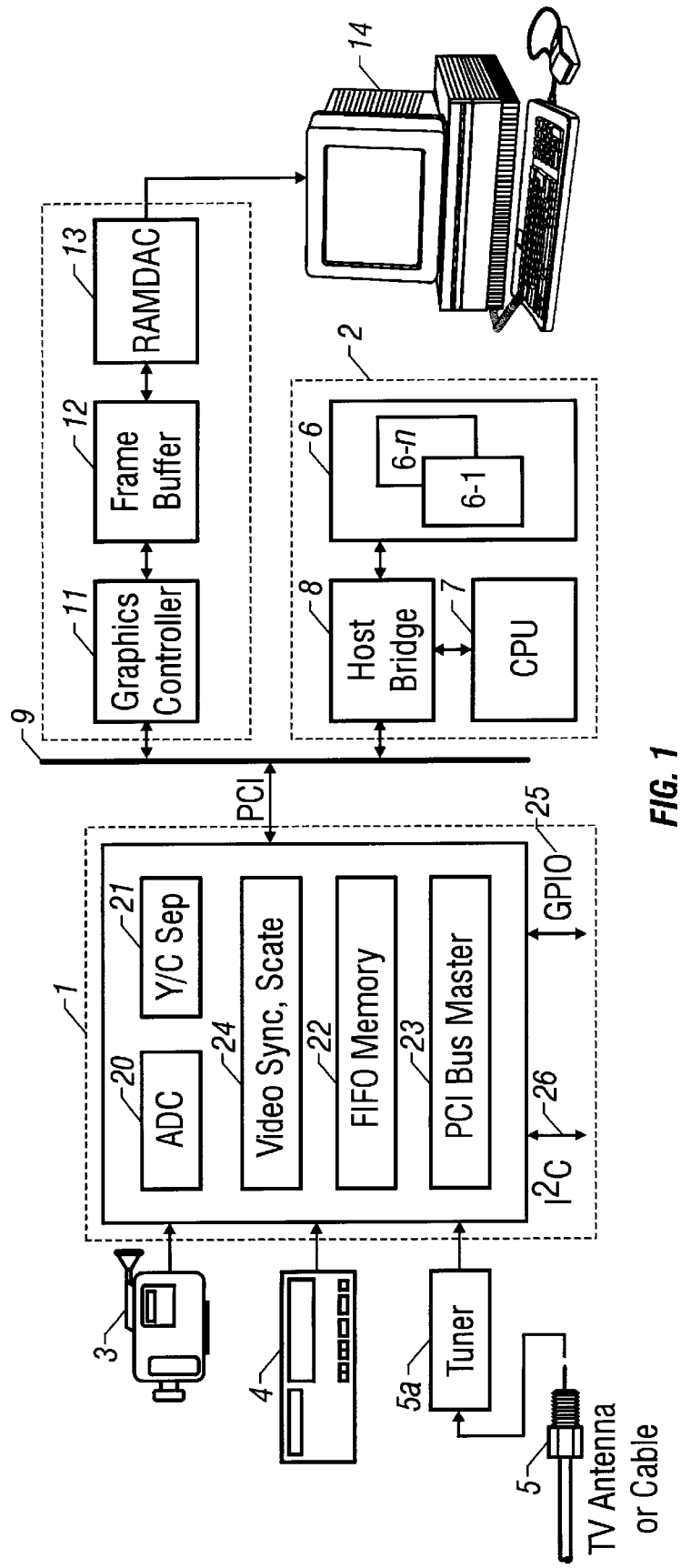
FIG. 1 is a block diagram of a prior art electronic video tuner system and computer system that may be used with the present invention.

FIG. 1 is a block diagram of a prior art electronic video decoder system 1 and computer system 2 that may be used with the present invention. Any of several video sources, such as a video camera 3, VCR 4, or a television antenna or cable signal source 5 processed through an RF tuner 5a, are coupled to the video decoder system 1, which may be, for example, a Rockwell Semiconductor Systems Bt848A single-chip video capture processor and PCI Bus Master, available from Rockwell Semiconductor Systems, Newport Beach, Calif. The video decoder system 1 can place video data directly into the system memory 6 of the computer system 2 for video capture applications. The computer system 2 includes the system memory 6, a central processing unit 7, and a host bridge 8 to couple the computer system to a conventional bus 9, such as the PCI Bus. The video decoder system 1 can also provide video data to a computer graphics adapter 10, which includes a graphics controller 11, a frame buffer 12, and a RAMDAC 13. The output of the video decoder system 1 is placed into a target area in the frame buffer 12 for video overlay applications, so that a video image stream may be displayed on a monitor 14.

The video decoder system 1 includes an analog-to-digital converter (ADC) 20 for converting the input video signal to a "raw" digital format. A Y/C separation circuit 21 separates luminance and color (chroma) information encoded within the digital signal into conventional YUV color space data values. The separated information is temporarily stored in a first-in-first-out (FIFO) memory 22. A PCI Bus Master circuit 23 provides controlled transfer of decoded, digitized video frames over the bus 9 connecting the video decoder system 1 to the computer system 2. (Although the illustrated embodiment shows use of a PCI bus, the invention is not limited to any particular bus). A video synchronization and scaling circuit 24 locks the video decoder system 1 to the incoming analog video signal and allows resizing of the video image size. Control of the video decoder system 1 is provided through either a general purpose input/output port 25 or a two-wire inter-integrated circuit interface 26. In an alternative embodiment, Y/C separation may be performed within the computer system 2 using appropriate programming.

For purposes of the invention, the video decoder system 1 is used to place data for a series of still video frames 6-1 . . . 6-n directly into the system memory 6 of the computer system 2, as shown in FIG. 1. If the data is not in YUV format, Y/C separation is performed by appropriate processing of such data to generate YUV values for each pixel of the series of still video frames 6-1 . . . 6-n. One method of separating luminance (Y) from chrominance (C) in a video signal is simply to use a notch filter to generate Y, and a bandpass filter to extract C. The U and V components of the YUV color space are derived from C by quadrature amplitude demodulation, in known fashion. Thereafter, in the preferred embodiment, a computer implementation of the method described below is applied to a set of n video frames to derive a still image with reduced visible noise. The computer implementation preferably executes on the CPU 7 of the computer system 2.

The invention reduces visible noise, along with some television color artifacts, in still images captured from a video stream by combining data from multiple video frames. Each frame comprises an XY array of picture element (pixel) data. In the preferred embodiment, each pixel includes data defining an intensity level (Y in the YUV color space model) as well as color values (UV in the YUV color space model). A weighted average of several frames of video is taken to generate a single still output frame. The weighting is determined adaptively in order to reduce inter-frame motion artifacts.

More particularly, one frame near the middle (in time) of a sequence of n frames is designated the "primary" frame P. Its weight, Wp, is "1" for every pixel. The intensity level Yp of each pixel of the primary frame is compared to the intensity level of the corresponding pixel of each of the other n−1 bracketing frames. Based on the absolute difference between the Y value of a primary-frame pixel and that of another frame n, a weight Wn is generated. Thus, every pixel location has its own set of n weights. Each weight Wn is set to one if the difference is below a selected threshold T1 and to zero if the difference is above a selected threshold T2. The values for T1 and T2 may be empirically determined. Between the two thresholds, the weight varies from one to zero, preferably linearly (although other functions may be used). To summarize, each weight W is calculated as follows:

If $|Yp-Yn|<T1$, $Wn=1$

Else If $|Yp-Yn|>T2$, $Wn=0$

Else $Wn=(|Yp-Yn|-T2)/(T1-T2)$

Once weights have been determined, YUV values for each output pixel of the desired still frame are calculated as follows:

$Yout=(W_1*Y_1+ \ldots +W_n*Y_n)/(W_1+ \ldots +W_n)$ $Uout=(W_1*U_1+ \ldots +W_n*U_n)/(W_1+ \ldots +W_n)$ $Vout=(W_1*V_1+ \ldots +W_n*V_n)/(W_1+ \ldots +W_n)$ where $(Y_1, U_1, V_1) \ldots (Y_n, U_n, V_n)$ are the corresponding pixel values from each frame 1 to n.

The resulting output has substantially less visible noise than a simple unweighted average. The algorithm described above is much faster and simpler to implement than true multi-pixel motion estimation, which is not really necessary in a series of nominally-still image. Since averaging is done in the YUV color space, and since weights are based only on intensity rather than partially on color information, television-related color artifacts are reduced.

While the YUV color space model is shown in the illustrated embodiment, other color space models may be used if the models define each pixel as having color space coordinates defining intensity and color values, directly or indirectly. For example, a suitable color space model may have separate intensity and color values, or such information can be derived from the color space coordinates, or the color space coordinates can be separately weighted. For instance, for an RGB color space model, there is no separate intensity channel. However, each color axis (R, G, B) can be weighted separately, or the RGB values for a pixel can be used to calculate back to an intensity value which is used for weighting in accordance with the invention. Other color space models to which the invention can be adapted are YCrCb and YIQ.

Figure 2:
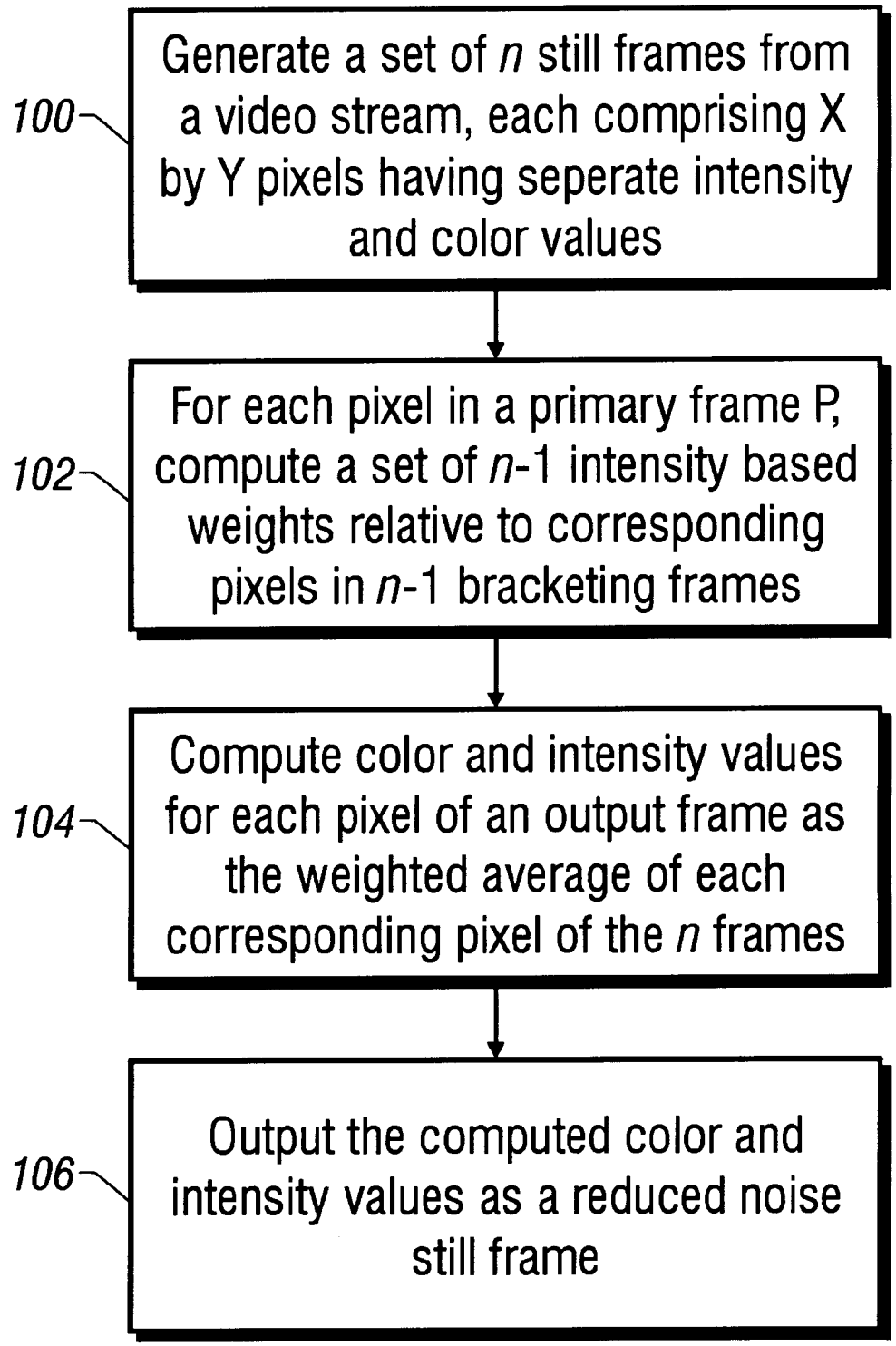
FIG. 2 is a flowchart of a preferred embodiment of the invention.

FIG. 2 is a flowchart of a preferred embodiment of the invention. Initially, a set of still frames are generated by the video decoder system 1 and placed in the system memory 6 of the computer system 2 (STEP 100). Each frame comprises X by Y pixels, each pixel having color space coordinates defining intensity and color values, directly or indirectly (e.g., YUV) values. Next, for each pixel in a primary frame P, a set of n intensity-based weights relative to corresponding pixels in n−1 bracketing frames are computed as described above (STEP 102). Color and intensity values are computed for each pixel of an output frame as the weighted average of each corresponding pixel of the n frames, as described above (STEP 104). Lastly, the computed color and intensity values of the output frame are output (e.g., to a monitor or data file) as a reduced noise still frame (STEP 106).

Computer Implementation

Aspects of the invention may be implemented in hardware or software, or a combination of both. However, preferably, the algorithms and processes of the invention are implemented in one or more computer programs executing on programmable computers each comprising at least one processor, at least one data storage system (including volatile and non-volatile memory and/or storage elements), at least one input device, and at least one output device. Program code is applied to input data to perform the functions described herein and generate output information. The output information is applied to one or more output devices, in known fashion.

Each program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CD-ROM, tape, or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. For example, the captured still frame may be directly output to a printer, or transmitted electronically to another computer. Accordingly, other embodiments are within the scope of the following claims.

What is claimed is:

1. A method for combining a set of n still image frames into a single reduced noise still image, each frame comprising X by Y pixels, each pixel having color space coordinates defining intensity and color values, including the steps of:

(a) for each pixel in a primary frame P of the set of still image frames, computing a set of n intensity-based weights Wn relative to corresponding pixels in n−1 bracketing still image frames;

(b) computing color and intensity values for each pixel of an output frame as the weighted average of each corresponding pixel of the n still image frames; and (c) outputting the computed output frame as a reduced noise still frame, wherein each pixel in each still image frame n has an intensity value Yn, wherein each pixel in the primary frame P has an intensity value Yp, and the step of computing a set of n intensity-based weights Wn includes the step of computing each weight Wn according to the relationships:

$$\text{If} |Yp-Yn|<T1, Wn=1$$

$$\text{Else If} |Yp-Yn|>T2, Wn=0$$

$$\text{Else } Wn=(|Yp-Yn|-T2)/(T1-T2)$$

where T1 and T2 are selectable thresholds.

2. The method of claim 1, wherein each pixel in each still image frame n has color values Un and Vn, and wherein the step of computing color and intensity values for each pixel of an output frame includes the step of computing YUV values for each pixel of the output frame according to the relationships:

$$Y\text{out}=(W_1{}^*Y_1+\ldots+W_n{}^*Y_n)/(W_1+\ldots+W_n)$$

$$U\text{out}=(W_1{}^*U_1+\ldots+W_n{}^*U_n)/(W_1+\ldots+W_n)$$

$$V\text{out}=(W_1{}^*V_1+\ldots+W_n{}^*V_n)/(W_1+\ldots+W_n)$$

where $(Y_1, U_1, V_1) \ldots (Y_n, U_n, V_n)$ are the corresponding pixel intensity and color values from each still image frame 1 to n.

3. A system for combining a sequence of electronically-encoded image frames into a single reduced noise still image, including:

(a) a video decoder system and computer system for generating a set of n still image frames, each still image frame comprising X by Y pixels, each pixel having color space coordinates defining intensity and color values; and (b) a programmed processor in the computer system for:

(1) computing a set of n intensity-based weights Wn relative to corresponding pixels in n−1 bracketing still image frames for each pixel in a primary frame P of the set of still frames; and (2) computing color and intensity values for each pixel of an output frame as the weighted average of each corresponding pixel of the n still image frames, the output frame having reduced noise, wherein each pixel in each still image frame n has an intensity value Yn, wherein each pixel in the primary frame P has an intensity value Yp, and the program for computing a set of n intensity-based weights Wn further computes each weight Wn according to the relationships:

$$\text{If} |Yp-Yn|<T1, Wn=1$$

$$\text{Else If} |Yp-Yn|>T2, Wn=0$$

$$\text{Else } Wn=(|Yp-Yn|-T2)/(T1-T2),$$

where T1 and T2 are selectable thresholds.

4. The system of claim 3, wherein each pixel in each still image frame n has color values Un and Vn, and wherein the program for computing color and intensity values for each pixel of an output frame further computes YUV values for each pixel of the output frame according to the relationships:

$$Y\text{out}=(W_1{}^*Y_1+\ldots+W_n{}^*Y_n)/(W_1+\ldots+W_n)$$

$$U\text{out}=(W_1{}^*U_1+\ldots+W_n{}^*U_n)/(W_1+\ldots+W_n)$$

$$V\text{out}=(W_1{}^*V_1+\ldots+W_n{}^*V_n)/(W_1+\ldots+W_n)$$

where $(Y_1, U_1, V_1) \ldots (Y_n, U_n, V_n)$ are the corresponding pixel intensity and color values from each still image frame 1 to n.

5. A computer program, residing on a computer-readable medium, for combining a set of n still image frames into a single reduced noise still image, each frame comprising X by Y pixels, each pixel having color space coordinates defining intensity and color values, the computer program comprising instructions for causing a computer to:

(a) for each pixel in a primary frame P of the set of still image frames, compute a set of n intensity-based weights Wn relative to corresponding pixels in n−1 bracketing still image frames;

(b) compute color and intensity values for each pixel of an output frame as the weighted average of each corresponding pixel of the n still image frames; and (c) output the computed output frame as a reduced noise still frame, wherein each pixel in each still image frame n has an intensity value Yn, wherein each pixel in the primary frame P has an intensity value Yp, and the instructions for causing a computer to compute a set of n intensity-based weights Wn further includes instructions for causing a computer to compute each weight Wn according to the relationships:

$$\text{If} |Yp-Yn|<T1, Wn=1$$

$$\text{Else If} |Yp-Yn|>T2, Wn=0$$

$$\text{Else } Wn=(|Yp-Yn|-T2)/(T1-T2)$$

where T1 and T2 are selectable thresholds.

6. The computer program of claim 5, wherein each pixel in each still image frame n has color values Un and Vn, and wherein the instructions for causing a computer to compute color and intensity values for each pixel of an output frame further includes instructions for causing a computer to compute YUV values for each pixel of the output frame according to the relationships:

$$Y\text{out}=(W_1{}^*Y_1+\ldots+W_n{}^*Y_n)/(W_1+\ldots+W_n)$$

$$U\text{out}=(W_1{}^*U_1+\ldots+W_n{}^*U_n)/(W_1+\ldots+W_n)$$

$$V\text{out}=(W_1{}^*V_1+\ldots+W_n{}^*V_n)/(W_1+\ldots+W_n)$$

where $(Y_1, U_1, V_1) \ldots (Y_n, U_n, V_n)$ are the corresponding pixel intensity and color values from each still image frame 1 to n.

* * * * *